(12) United States Patent
Lane

(10) Patent No.: US 11,638,422 B1
(45) Date of Patent: May 2, 2023

(54) USE OF CRUDE CORN OIL FOR REDUCING PHYTOTOXICITY OF PESTICIDES AND PLANT WASHES AND ENHANCING OVERALL PLANT HEALTH

(71) Applicant: Ronald Edwin Lane, Colfax, CA (US)

(72) Inventor: Ronald Edwin Lane, Colfax, CA (US)

(*) Notice: Subject to any disclaimer, the term of this patent is extended or adjusted under 35 U.S.C. 154(b) by 79 days.

(21) Appl. No.: 17/391,871

(22) Filed: Aug. 2, 2021

(51) Int. Cl.
*A01N 25/32* (2006.01)
*A01N 65/40* (2009.01)

(52) U.S. Cl.
CPC ............. *A01N 25/32* (2013.01); *A01N 65/40* (2013.01)

(58) Field of Classification Search
CPC ................................. A01N 25/32; A01N 65/40
See application file for complete search history.

(56) References Cited

U.S. PATENT DOCUMENTS 8,142,801 B2 * 3/2012 Jones .................... A01N 35/02
424/407

* cited by examiner

*Primary Examiner* — Michael P Cohen
(74) *Attorney, Agent, or Firm* — Craig A. Simmermon

(57) ABSTRACT

The present invention relates to formulations of crude degummed corn oil (CDGCO) for use as plant biostimulants, for increasing yield and quality and for offsetting phytotoxic effects of active ingredients in pesticides and plant washes. Such formulations are typically combined with one or more emulsifier and a solvent, and or just an emulsifier or just a solvent, and combined with water and applied to plants as a spray or fog to foliage, or pruning cuts, or a a root zone drench, or to seeds. The invention improves upon existing pesticide formulations by reducing phytotoxicity. The invention provides for affordable plant biostimulant formulations for agriculture for producing better quality and higher yielding crops when subject to environmental stresses.

12 Claims, No Drawings

USE OF CRUDE CORN OIL FOR REDUCING PHYTOTOXICITY OF PESTICIDES AND PLANT WASHES AND ENHANCING OVERALL PLANT HEALTH

FIELD OF THE INVENTION

The present invention relates to the formulation and application of pesticides, biostimulants and plant washes for agriculture, horticulture, and general plant care. It builds upon integrating principles of plant physiology, plant protection, agronomy, and agrochemistry, and upon U.S. patent application Ser. No. 16/798,380, whereby waxes bearing triacontanol mitigate phytotoxicity of volatile essential oil-based pesticides.

BACKGROUND OF INVENTION

The first known pesticide was elemental sulfur dusting used in ancient Sumer about 4,500 years ago. Horticultural oils didn't come into use until the late Nineteenth Century when mixtures of kerosene (a petroleum-based oil) and soap (an emulsifier) were mixed with water and sprayed on insect-infested crops. While effective at killing insects, mites, and as a fungicide, these early horticultural oils would often cause severe phytotoxicity. As such they came to be used primarily on dormant plants and were known as dormant oils. In the middle of the $20^{th}$ Century, refining technology improved to produce lighter petroleum-based oils with fewer impurities, thus reducing phytotoxicity and enabling usage on actively growing plants. While, visible signs of phytotoxicity may have been absent, highly refined petroleum-based oils severely disrupt photosynthesis, an effect which can last for days—this observed by Professor Loren Oki in the Plant Sciences Department at UC Davis in the early $21^{st}$ Century. In the 1980s neem oils started to be used in agriculture in the United States. While petroleum-based oils worked by compromising cell membranes and suffocating, neem oils do the same, but also contain azadirachtin, which acts as a feeding inhibitor and growth disruptor in a wide variety of insects, thus improving the overall efficacy of a horticultural oil. Neem oil and water sprays also negatively impact photosynthesis, an effect that can last for weeks—this observed by Professor Michael Parrella at UC Davis in the early $21^{st}$ Century. It is only more recently that horticultural oils have included vegetable oils, including volatile essential oils. Fully processed corn oil has been incorporated into pesticides for purposes of smothering insects and mites, and its use is not novel. Volatile essential oils contain phytochemicals that can act as anti-feedants, affect the nervous system of insects and mites in multiple ways, and disrupt cellular membranes and metabolic processes. While these volatile essential oils have superior efficacy over vegetable and petroleum based horticultural oils, they are highly prone to causing phytotoxicity.

A plant biostimulant is any substance or microorganism applied to plants with the aim to enhance nutrition efficiency, abiotic stress tolerance and/or crop quality traits, regardless of its nutrients content. The first discussion of "biogenic stimulant" theory can be attributed to Prof. V. P. Filatov and was started in 1933 in the USSR (Filatov, 1944, 1951). Filatov proposed that biological materials derived from various organisms, including plants, that have been exposed to stressors could affect metabolic and energetic processes in humans, animals, and plants. In a review article published in Sciential Horticulturae in 2015 by Patrick du Jardin, plant known biostimulants are classified into seven categories: 1. Humic/Fulvic Acids. 2. Seaweed/Botanical Extracts. 3. Protein Hydrolysates. 4. Chitosan/Biopolymers. 5. Beneficial Minerals. 6. Beneficial Bacteria 7. Beneficial Fungi. To date, no published research documents corn oil as a plant biostimulant.

Lane showed that combining waxes with volatile essential oils reduced the phytotoxicity of volatile essential oil pesticide formulations, and when such waxes contained triacontanol, improved plant growth [U.S. patent application Ser. No. 16/798,380].

It is not just horticultural oils that have concerns over phytotoxicity. The EPA recognizes the phytotoxic tendency of pesticides and requires all FIFRA Section 3 registered pesticides to undergo standardized phytotoxicity testing. This does not mean that phytotoxic pesticides are screened from the market, in fact, most of EPA registered pesticides are phytotoxic to some degree, as verified in numerous published research studies.

The present invention finds that raw corn oil is a plant biostimulant, and that when combined as an emulsifiable concentrate with phytotoxic active ingredients such as volatile essential oils, organophosphates, chlorinated hydrocarbons, pyrethroids, and neonicotinoids, can offset the phytotoxicity of said pesticides and improve overall plant health.

SUMMARY OF THE INVENTION

It is the objective of the invention to increase yields and qualities of agricultural crops by using the biostimulant, crude and degummed corn oil (CDGCO), to reduce the phytotoxicity of pesticide formulations. Previous strategies for reducing phytotoxicity of pesticides have focused on reducing application rates, putting conditions on when to apply, or by slowing the release of active ingredients. Using biostimulants to offset phytotoxicity of pesticides has not been a strategy of pesticide formulators.

Raw corn oil differs from the refined corn oil traditionally sold for human consumption and formulated into pesticides. Refined corn oil is expeller-pressed, then solvent-extracted using hexane or isohexane. The solvent is evaporated from the corn oil, recovered, and reused. After extraction, the corn oil is then refined by degumming and/or alkali treatment, which removes phosphatides. Alkali treatment also neutralizes free fatty acids and removes color. Final steps in refining include the removal of waxes and deodorization by steam distillation under a vacuum. CDGCO is taken after the degumming step.

It is a finding of the invention that crude degummed corn oil (CDGCO) is a plant biostimulant when applied via foliar application at a suitable rate and in a properly emulsified solution. Components of CDGCO that contribute to the biostimulant effect include: 1. Triacontanol. 2. Ubiquinone (Coenzyme Q). 3. Vitamins (E, D3, K1, A, B1, B2, B5). 4. Iodide. 5. Zeaxanthin. 6. Fatty acids (linoleic acid, oleic acid, palmitic acid, stearic acid). While biostimulants have been studied for almost 90 years, corn oil has never been classified in the literature as a biostimulant for enhancing plant yield or quality.

It is a finding of the invention that the biostimulant, CDGCO, when emulsified and combined with pesticides with known phytotoxicity, can help plants deal with phytotoxic stresses, and thus offset the damaging effects of these pesticides and even enhance overall plant health.

In one embodiment of the invention, CDGCO is combined with water, an emulsifier, and a phytotoxic, synthetic pesticide, such as acephate (an organophosphate), and sprayed on a crop to control a particular pest, such as aphids.

Efficacy of the active ingredient is maintained, while acephate plus CDGCO treated plants have higher yields than untreated plants or those treated with acephate alone.

In another aspect of the invention, CDGCO is combined with water, an emulsifier, and a volatile essential oil, such as cinnamon oil, and sprayed on a crop to control a particular pest, such as spider mites. Efficacy of the essential oil is maintained, while cinnamon oil plus CDCGO treated plants have higher yields than untreated plants or those treated with cinnamon oil alone.

In another embodiment of the invention, CDGCO is combined with water and an emulsifier, or multiple emulsifiers, and sprayed on a crop such as basil to wash off pests and increase yield. Treated plants yield greater biomass with a higher terpene content.

DETAILED DESCRIPTION OF THE INVENTION

It is a finding of the invention that crude degummed corn oil (CDGCO) is a plant biostimulant that when applied via foliar application at a suitable rate and in a properly emulsified solution (with or without a solvent) reduces plant stresses and improves plant yield and quality. To function as a biostimulant a suitable rate of CDGCO in spray solution with water and emulsifier(s) and or solvents, is in the range of 0.1% to 3%. Components of CDGCO that contribute to the biostimulant effect include: 1. Triacontanol. 2. Ubiquinone (Coenzyme Q). 3. Vitamins (E, D3, K1, A, B1, B2, B5). 4. Iodide. 5. Zeaxanthin. 6. Fatty acids (linoleic acid, oleic acid, palmitic acid, stearic acid). Triacontanol's benefit as a plant biostimulant is well documented in scientific literature and generally optimized at concentrations in the range of 10 to 200 parts per billion in foliar applications. That crude corn oil contains triacontanol is not widely known. Coenzyme Q is produced by plants. It plays a vital role in cellular metabolism. It also protects cells from oxidative damage in a number of ways. Plants subject to various stress are subject to greater oxidative damage. Vitamin E is also produced by plants and protects cells from oxidative damage. Vitamin D is known to increase calcium uptake from the soil and enhance adventitious root formation in plants. B vitamins play a role as a cofactor in enzyme-catalyzed reactions and contribute to many metabolic activities in plants. Vitamin B1, for instance, plays a role in plant disease resistance and stress tolerance. Iodide is not an essential plant nutrient, but fertilizing with it has been shown to aid in biomass production and increase the antioxidant levels in plants, which provides drought and stress resistance. Zeaxanthin modulates light energy and keeps chlorophyll at appropriate levels during photosynthesis. It has the potential to serve as a plant biostimulant. In practice, tomato plants treated with weekly applications of a pesticide combining CDGCO with cornmint oil, emulsifiers and water, and subsequently subject to several episodes of extreme heat (40 degrees C.) and drought stress (extended periods at permanent wilting point), produced over twice the fresh weight of tomatoes than non-treated controls.

It is a finding of the invention that the biostimulant, CDGCO, when emulsified with or without a solvent, and combined with pesticides with known phytotoxicity, can help plants cope with phytotoxic stresses, and thus offset the damaging effects of these pesticides and even enhance overall plant health. The afore mentioned study on tomato plants is an example CDGCO mitigating harmful effects of an essential oil, while enhancing yield on plants exposed to abiotic stresses. Similar results were observed with acephate and pyrethrum treated plants when combined with CDGCO.

Contribution to the Art

Biostimulants first entered the scientific literature in the early 20$^{th}$ Century. In all the ensuing years pesticide formulators have not taken advantage of biostimulants to offset the phytotoxic effects of their formulations. It is possible, and likely, that applying biostimulants, including CDGCO, prior to or following a pesticide application will mitigate pesticide phytotoxicity, but formulating the biostimulant with the pesticide is certainly more efficient from a labor and energy standpoint.

CDGCO is effective at reducing phytotoxicity of pesticides, which leads to higher yields and better quality of crops.

Crude degummed corn oil (CDGCO) is a plant biostimulant in wide abundance and therefore can be formulated into pesticides and stand-alone biostimulants at an affordable cost.

As a pesticide, CDGCO is superior to processed corn oil in that fewer biostimulants have been stripped from it, and less energy goes into producing CDGCO, so a CDGCO formulated pesticide is more energy efficient than one consisting of equal amounts of processed corn oil.

Global warming is causing overall higher temperatures, longer droughts, and greater temperature extremes, putting crops under increasingly more stress. CDGCO is an affordable plant biostimulant that can improve yields for plants under stress.

EXAMPLES

Example 1

A concentrated pesticide is created with 30% CDGCO, 10% peppermint oil, 10% emulsifiers, and 50% water. One gallon of the concentrate is added to one hundred gallons of water and sprayed on an acre of grapevines to control powdery mildew and spider mites. Pests are controlled and plants produce bigger and sweeter grapes with deeper color and increased terpenes and flavonoids.

Example 2

A concentrated pesticide is created with 30% pyrethrum, 15% CDGCO, 10% emulsifiers, and 45% water. One gallon of the concentrate is added to one hundred gallons of water and sprayed on four acres of cabbage to control aphids. Aphids are controlled and cabbage heads at harvest are larger than those of untreated plants.

Example 3

A plant biostimulant is created by mixing a concentrate consisting of 60% CDGCO, 25% isopropyl alcohol, and 15% emulsifier. One pint to one half gallon of concentrate are added to 100 gallons of water and sprayed throughout an almond orchard just prior to a forecasted heatwave. Treated trees abort less fruit and at the end of the season yields are greatly superior to non-treated trees.

What is claimed is:
1. A plant biostimulant formulation consisting of crude degummed corn oil (CDGCO), comprising of 0.1% to 5.0% of CDGCO, an emulsifier and/or a solvent, and water.

2. The formulation of claim 1, wherein the formulation is applied to seeds.

3. The formulation of claim 1, wherein the formulation is applied to roots.

4. The formulation of claim 1, wherein the formulation is applied to foliage.

5. The formulation of claim 1, wherein the formulation is applied to pruning cuts.

6. The formulation of claim 1, wherein the formulation is applied to cuttings.

7. A method for reducing phytotoxicity comprising application to a plant or a part of a plant a formulation comprising 0.1% to 5.0% of CDGCO, an emulsifier and/or a solvent, water, and an effective concentration of pesticidal active ingredient.

8. The method of claim 7, wherein the formulation is applied to seeds.

9. The method of claim 7, wherein the formulation is applied to roots.

10. The method of claim 7, wherein the formulation is applied to foliage.

11. The method of claim 7, wherein the formulation is applied to pruning cuts.

12. The method of claim 7, wherein the formulation is applied to cuttings.

\* \* \* \* \*